United States Patent [19]

Takagi et al.

[11] Patent Number: 4,614,467
[45] Date of Patent: Sep. 30, 1986

[54] CAM MILLING MACHINE

[75] Inventors: Masayoshi Takagi, Kariya; Takehiko Hayashi, Toyota; Fumio Sakamoto, Kariya, all of Japan

[73] Assignee: Toyoda Koki Kabushiki Kaisha, Kariya, Japan

[21] Appl. No.: 631,202

[22] Filed: Jul. 16, 1984

[30] Foreign Application Priority Data

Jul. 20, 1983 [JP] Japan ................. 58-132108

[51] Int. Cl.$^4$ .............................................. B23C 3/08
[52] U.S. Cl. .......................................... 409/199; 29/6;
51/105 SP; 82/9; 409/239
[58] Field of Search ................... 29/6; 409/199, 200, 409/232, 237–239, 240–242, 286, 337, 343; 82/9; 51/73 GC, 105 SP; 279/6

[56] References Cited

U.S. PATENT DOCUMENTS

| | | | |
|---|---|---|---|
| 2,650,522 | 9/1953 | Godfriaux | 409/199 X |
| 3,540,347 | 11/1970 | Randall | 409/200 |
| 3,685,845 | 8/1972 | Fischer et al. | 279/6 X |
| 3,935,765 | 2/1976 | Peltier et al. | 51/105 SP X |
| 4,116,111 | 9/1978 | Schmid | 51/105 SP X |
| 4,206,393 | 6/1980 | Chiba | 29/6 X |

FOREIGN PATENT DOCUMENTS 2008461 6/1979 United Kingdom .
1596635 8/1981 United Kingdom .

OTHER PUBLICATIONS

Heller's Brochures "Camshaft Milling Machines RFN", Heller Form 5-002.5-80.6 GB and Milling of Camshafts, Heller Form 5-100.5-81.3 GB.

Primary Examiner—Gil Weidenfeld
Assistant Examiner—Steven C. Bishop
Attorney, Agent, or Firm—Oblon, Fisher, Spivak, McClelland & Maier

[57] ABSTRACT

A cam milling machine having a headstock and a tailstock, which are fixed on a bed and are horizontally spaced from each other for carrying at a time two camshafts to be rotatable respectively on their axes which extend horizontally in parallel relation with each other. A tool support carrier is guided on the top of the headstock and is movable by an index feed device in a horizontal direction parallel to the axis of each camshaft. Two tool supports each carrying a milling cutter are carried on the tool support carrier to be vertically movable by respective tool feed devices, each for moving the milling cutter associated thereto toward and away from one of the camshafts. The tool support carrier is moved by an index feed device in the axial direction of the camshafts so that each milling cutter is selectively brought into alignment with one of cams on each camshaft. Further, transfer bars horizontally extend across the space between the headstock and tailstock, so that unfinished camshafts are loaded two at a time into the machine from the front of the machine and after machining, are unloaded from the rear of the machine.

5 Claims, 8 Drawing Figures

4,614,467

CAM MILLING MACHINE

BACKGROUND OF THE INVENTION

1. Field of the Invention:

The present invention relates to a cam milling machine for successively machining cams of a workpiece such as, for example, an automotive camshaft with a milling cutter.

2. Description of the Prior Art:

A known cam milling machine is provided with an upright worktable, which is mounted on a bed to be slidable in a first horizontal direction. A headstock and a tailstock are secured to an elevational surface of the worktable for supporting at a time two camshafts rotatable about respective axes which are vertically spaced and which extend in the first horizontal direction. A cutter support by which two milling cutters are carried for rotation about vertically spaced respective horzontal axes is mounted on the bed for indexing movement in the first horizontal direction as well as for feed movement toward and away from the workpieces in a second horizontal direction transverse to the first horizontal direction. The milling cutters are brought into axial alignment respectively with selected cams on the two camshafts through the indexing movement and then, into cutting engagements with the selected cams through the feed movement.

With this design concent, the known machine has an easy front-side accessibility at the cost of the rear-side accessibility being presented. In particular, the upright worktable prevents a workpiece transfer way from horizontally extending across the space between the headstock and the tailstock from the front of the machine toward the rear, and therefore, the known machine is unable to meet the requirement for integration onto an in-line type workpiece transfer device. Further, the cutting points to each of which the largest load is applied are considerably spaced upwards apart from slideways of the upright worktable formed at the lower surface, and this is liable to decrease the supporting rigidity of the upright worktable, which may results in a tilting motion of the upright worktable as well as in chatter of the milling cutters during the machining operation.

SUMMARY OF THE INVENTION

Accordingly, it is a principal object of the present invention to provide an improved cam milling machine which makes it easy to load a workpiece thereinto and unload the same therefrom, particularly, by means of an automatic loading/unloading device.

Another object of the present invention is to provide an improved cam milling machine capable of being integrated onto an in-line type workpiece transfer device.

A further object of the present invention is to provide an improved cam milling machine of the character set forth above which provides large supporting rigidity of a workpiece so as to endure heavy duty.

Briefly, according to the present invention there is provided a cam milling machine, wherein at least one workpiece is supported at its opposite ends by first and second support devices fixed on a base frame so as to be rotated by a workpiece drive device about its axis extending in a first direction. A tool support carrier is guided on one of the firt and second support devices and is slidable by an index feed device in the first direction. At least one tool support rotatably carrying a rotary tool is mounted by the tool support carrier and is movable by a tool feed device so as to move the rotary tool toward and away from the at least one workpiece. An index feed device is connected to the tool support carrier for moving the same in the first direction so as to selectively bring the rotary tool into alignment with cam portions formed on the at least one workpiece.

With this configuration, the tool support carrier is movable to present the rotary tool into the machining space defined between the first and second support devices, but is retracted to withdraw the rotary tool from the machining space after the machining operation. Thus, it is possible to integrate the machine with an in-line type workpiece transfer device in such a manner that the same passes across the machining space from one side of the machine towards the other side. Moreover, the guide way along which the tool support carrier is moved can be disposed close to the axis of the workpiece supported by the first and second support devices, and this results in increasing the workpiece supporting rigidity of the workpiece.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of preferred embodiments when considered in connection with the accompanying drawings, wherein like reference numerals designate identical or corresponding parts throughout the several views, and in which:

FIG. 3 is a sectional view of the apparatus taken along the line III—III in FIG. 2;

DESCRIPTION OF THE PREFERRED EMBODIMENTS

Figure 1:
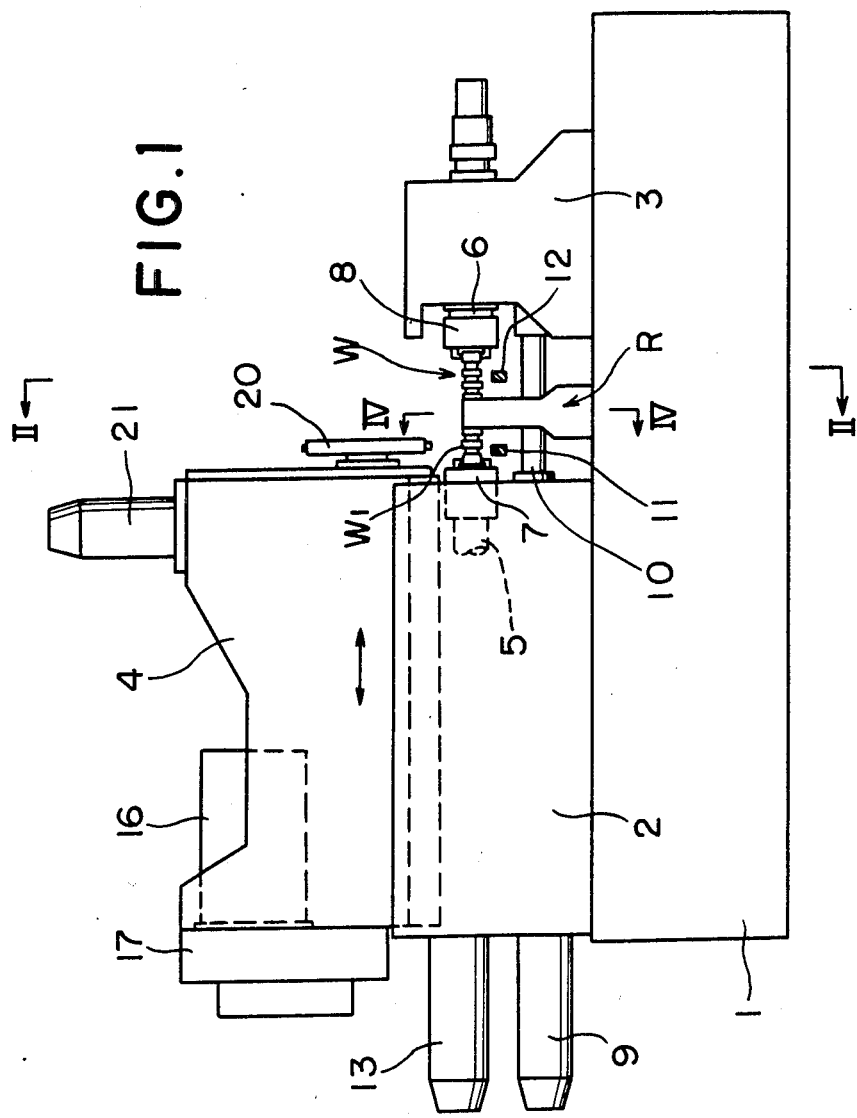
FIG. 1 is a front view of a cam milling machine according to the present invention.
Figure 2:
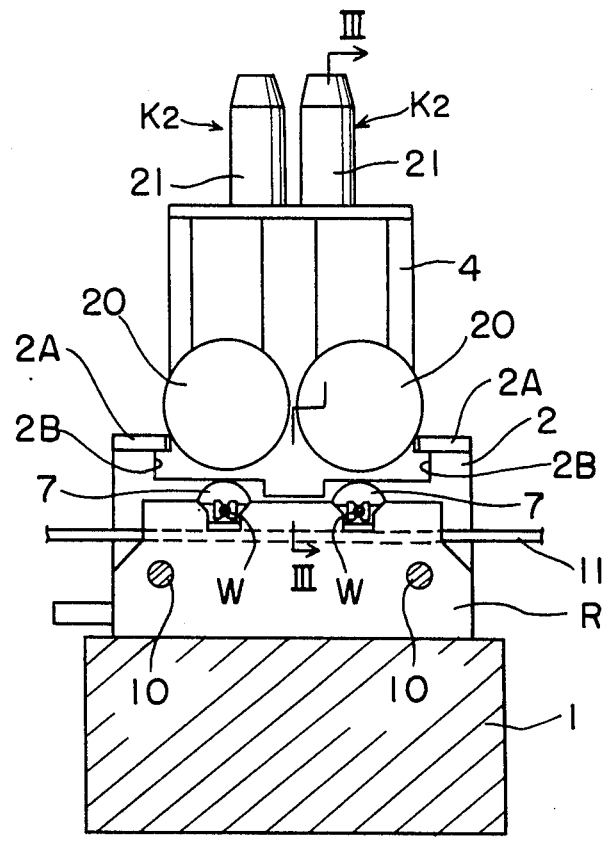
FIG. 2 is a sectional view of the apparatus taken along the line II—II in FIG. 1.
Figure 5:
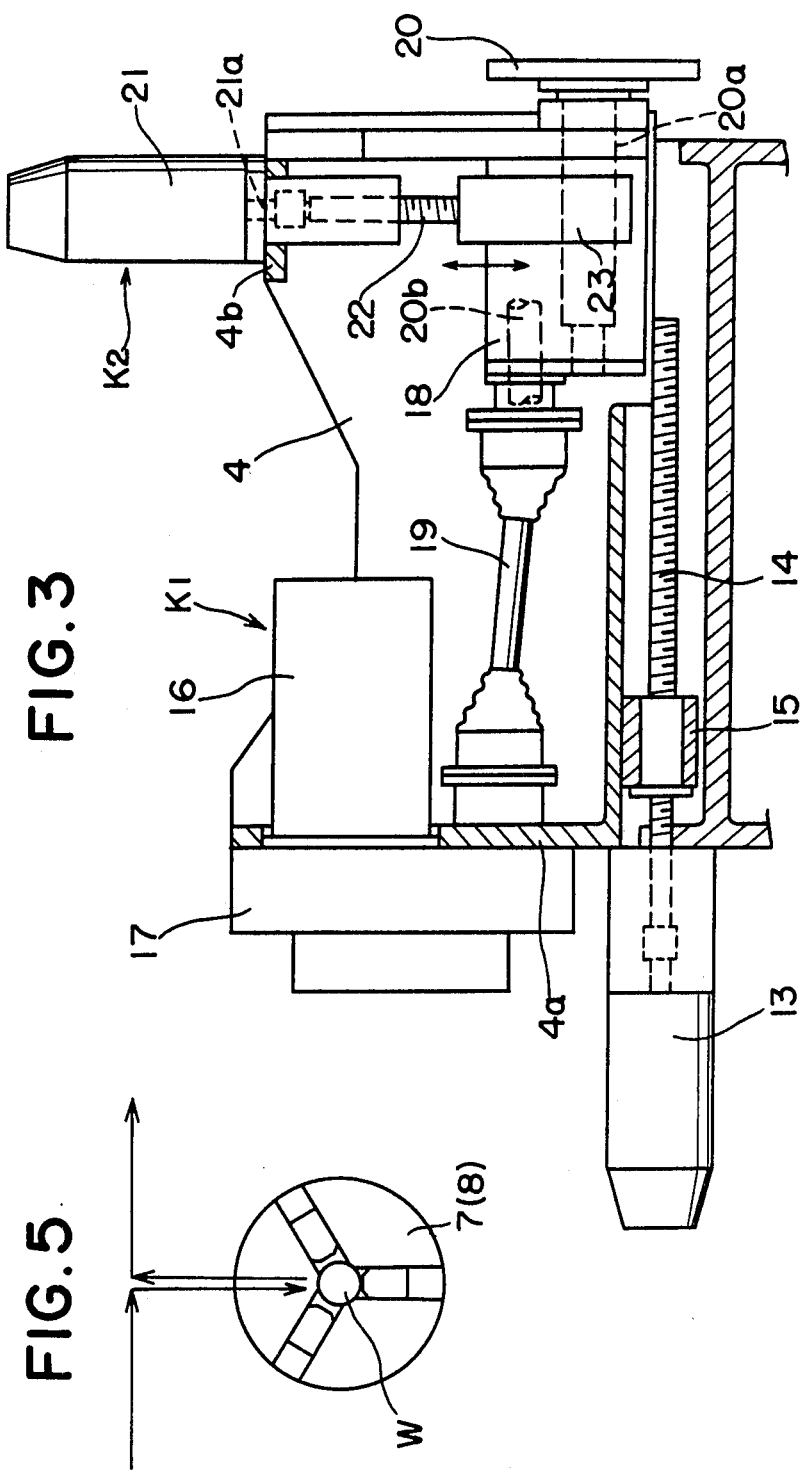
FIG. 5 is a front view of each the workpiece drive chucks used in the apparatus.

Referring now to the drawings and particularly to FIGS. 1 and 2 thereof, a cam milling machine according to the present invention is shown having a headstock 2 and a tailstock 3, which are fixedly mounted on a base frame or bed 1 with a predetermined space. A tool support carrier 4 is carried so as to be slidable on a guide way 2B which is formed on the top of the headstock 2 in a logitudinal direction thereof. The headstock 2 rotatably carries a pair of headstock spindles 5 and 5 in parallel relation with the guide way 2B, while the tailstock 3 rotatably carries a pair of tailstock spindles 6 and 6 in axial alignment, respectively with the headstock spindles 5 and 5. Each headstock spindle 5 and the axially aligned tailstock spindle 6 respectively have secured to their inner ends facing each other a pair of chucks 7 and 8 each with three jaws as shown in FIG. 5, by which a workpiece W such as, for example, a camshaft for an automotive engine is supported for rotation about the axes of the headstock and tailstock spindles 5 and 6. Thus, it will be apparent that the headstock 2 and the tailstock 3 are designed to rotatably carry two workpieces W at a time for simultaneous machining thereon. A steady rest R, referred to later in detail, is mounted on the bed 1 at the longitudinal mid portion for preventing the workpieces W from deflecting during a machining operation. The bodily rotation of each workpiece W with the supporting chucks 7 and 8 occurs by transmitting the rotation of a workpiece drive motor 9 to the associated headstock and tailstock spindles 5 and 6 through a conventional gear train, now shown. Two transmission shafts 10 and 10 are interposed between the headstock 2 and the tailstock 3 for rotating the tailstock spindles 6 and 6 in synchronous relation with the headstock spindles 5 and 5, respectively.

Under the workpieces W carried by the chucks 5 and 6, two transfer bars 11 and 12 extend in a horizontal direction transverse to the workpiece axes and are operable to carry out well-known lifting and carrying motions for loading the workpieces W onto, and unloading them, from the machine tool in that horizontal direction.

As best shown in FIG. 3, an index feed motor 13 is provided for effecting sliding movement of the tool support carrier 4. As the actuation of the index feed motor 13 causes a feed screw 14 to turn, a feed nut 15 in threaded engagement therewith is moved in the axial direction of the feed screw 14, so that the tool support carrier 4 to which the feed nut 15 is secured is moved in the axial direction of the headstock and tailstock spindles 5 and 6. The support carrier 4 vertically slidably carries two tool supports 18 and 18, in each of which a tool spindle 20a carrying a milling cutter 20 is supported to be rotatable about an axis parallel to the workpieces W. The milling cutter 20 has a plurality of cutter blades at its circumferential surface.

The support carrier 4 also incorporates therein two sets of tool drive mechanisms K1 and K1 each for rotating the milling cutter 20 and two sets of tool feed mechanisms K2 and K2 each for vertically moving the milling cutter 20. Each drive mechanism K1 is composed of a tool drive motor 16, a reduction gear box 17 for reducing the rotational speed of an output shaft (not shown) of the tool drive motor 16 at a predetermined ratio, and a constant velocity joint 19 connected to an output shaft (not shown) of the gear box 17 for transmitting rotation to a tool drive shaft 20b rotatably carried in each tool support 18.

Each tool feed mechanism K2 is composed of a tool feed motor 21 fixed on a right-top surface 4b of the tool support carrier 4, a feed screw 22 connected to an output shaft 21a of the feed motor 21 and a nut 23 threadedly engaged with the feed screw 22 to be vertically moved when the feed screw 22 is rotated. The nut 23 is secured to the tool support 18, and this enables the milling cutter 20 to be vertically moved bodily with the tool support 18 when the feed motor 21 is operated. Reference numerals 2A and 2A in FIG. 2 denote back-up plates, which prevent the support carrier 4 from floating during the machining operation.

Figure 4:
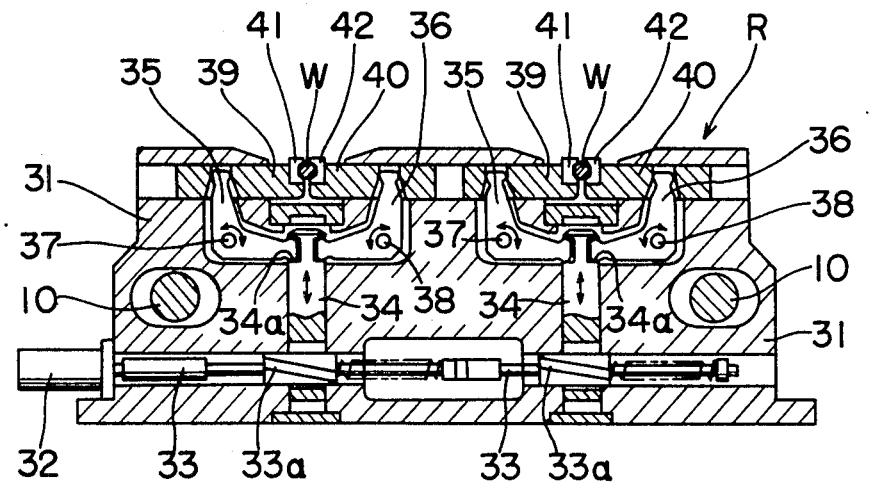
FIG. 4 is a sectional view of the apparatus taken along the line IV—IV in FIG. 1.

FIG. 4 illustrates the details of the aforementioned steady rest R. A cylinder device 32 is secured to a front lateral surface of a rest body 31 fixed on the bed 1. The cylinder device 32 is connected to a reciprocative rod 33 extending in a horizontal direction perpendicular to the axes of the workpieces W. The reciprocative rod 33 is formed with a pair of slanted surface portions 33a and 33a, which are respectively in wedge engagement with a pair of vertical rods 34 and 34 so that the same are vertically moved when the recprocative rod 33 is horizontally moved. Each vertical rod 34 is formed at its upper end with an annular groove 34a, with which is engaged is each one end of a pair of L-shape link arms 35 and 36. Each pair of the link arms 35 and 36 are carried in the rest body 31 to be respectively pivotal about hinge pins 37 and 38 and present other or upper ends thereof respectively into cavities (not numbered) formed in an associated pair of shoe holders 39 and 40, which are received in the rest body 31 for sliding movement in a horizontal direction parallel to the reciprocative rod 33. Thus, each pair of the shoe holders 39 and 40 are moved toward and away from each other in such a horizontal direction upon pivoting movements of the associated pair of the link arms 35 and 36. Further, each pair of shoe holders 35 and 36 have secured to inner ends thereof a pair of shoes 41 and 42, by which a corresponding one of the workpieces W and W carried on the machine is steadily held.

The operation of the first embodiment as constructed above will be described hereafter. The transfer bars 11 and 12, when preforming lifting and carrying motions, load two workpieces W and W at a time from the front of the machine into the machine in a direction normal to the drawing sheet, as viewed in FIG. 1. In the course of such lifting and carrying motions, each of the workpieces W is put at its opposite ends upon the lowest jaws of one set of the chucks 7 and 8, as viewed in FIG. 5, and is securedly clamped at its opposite ends when the chucks 7 and 8 are then operated. The rest apparatus R is brought into action at the same time to steadily hold the axial mid portion (i.e., a journal) of each workpiece W, whereupon the workpiece drive motor 9 is operated to rotate the two sets of the spindles 5 and 6 along with the workpieces W and W at a slow speed. The support carrier 4 is then slid by the operation of the index feed motor 13 to position the milling cutters 20 and 20 respectively over the leftmost cams W1 and W1 of the workpieces W and W. Subsequently, the motors 16 and 21 are in turn operated, whereby each milling cutter 20 is vertically moved while being rotated. During such vertical movement, each milling cutter 20 is gradually moved down as it performs a cam profiling motion which involves the repetition of upward and downward movements, whereby the leftmost cams W1 and W1 of the two workpieces W and W are machined simultaneously. In the cam profiling motion, each milling cutter 20 must be moved up and down to conform to a required profile of each cam W1. To this end, the vertical movement of each milling cutter 20 is numerically controlled in connection with rotation of the workpiece W to be machined thereby.

Each time the machining of one cam on each workpiece W is completed in the above-described manner, the support carrier 4 is indexed in the longitudinal direction to bring each milling cutter 20 over a successive cam, of each workpiece W, whereby cams W1, W2, W3 ... Wn of each workpiece W are in turn machined. The tool support carrier 4 is retracted to its original position upon completion of all the cams on each workpiece W. Each pair of the chucks 7 and 8 are then brought into their unclamping conditions, concurrently with which each pair of the shoe holders 39 and 40 are moved away from the associated workpiece W to release the same. The lifting and carrying motions of the transfer bars 11 and 12 are then followed, and this causes the two finished workpieces W being now supported at the opposite ends as shown in FIG. 5, to be unloaded from the machine in the horizontal direction normal to the drawing sheet, as viewed in FIG. 1 (e.g., toward the rear of the machine). Two other workpieces W and W are simultaneously set up instead in the machine in the aforementioned manner for subsequent machinings.

It is to be noted herein that although each workpiece W is liable to be flexed when being machined at a cam located at its axial mid portion, such flexing of the workpiece W can be completely prevented by the rest apparatus R. It is also to be noted that the holding force of each workpiece W by the shoes 41 and 42 is chosen to the extent that the workpiece W can be rotated smoothly.

Figure 6:
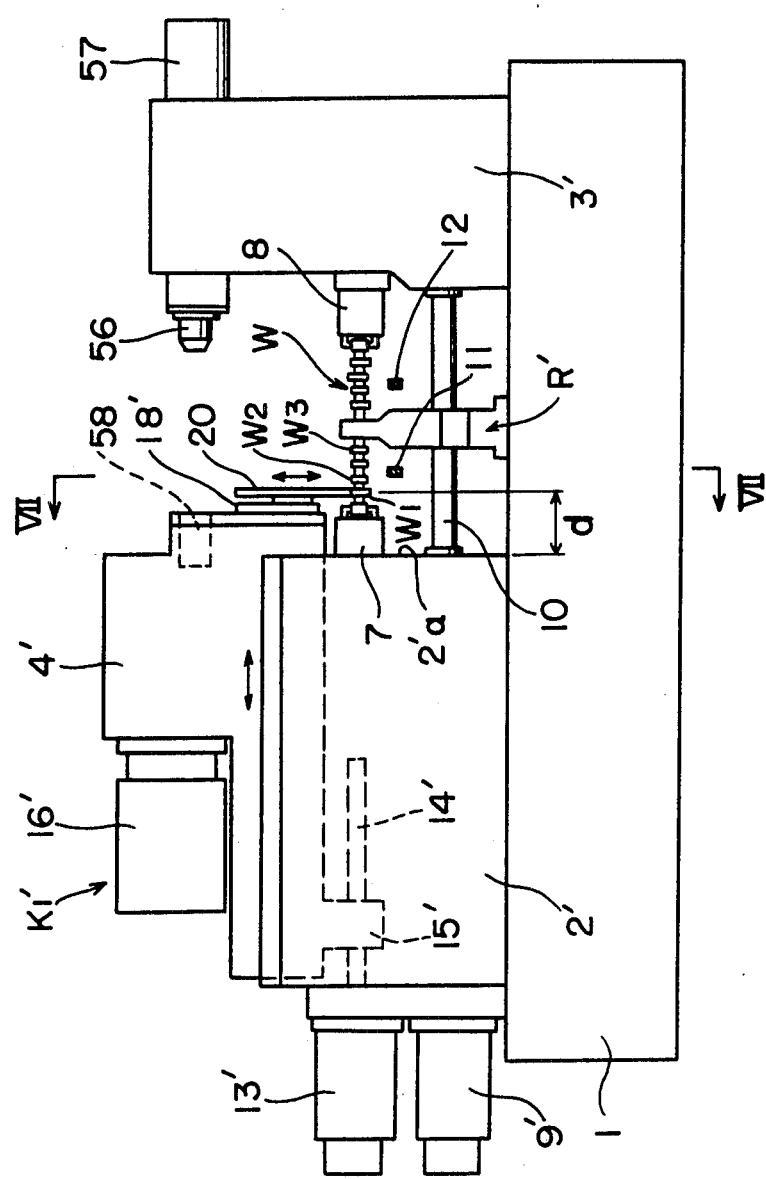
FIG. 6 is a front view of another embodiment according to the present invention.
Figure 7:
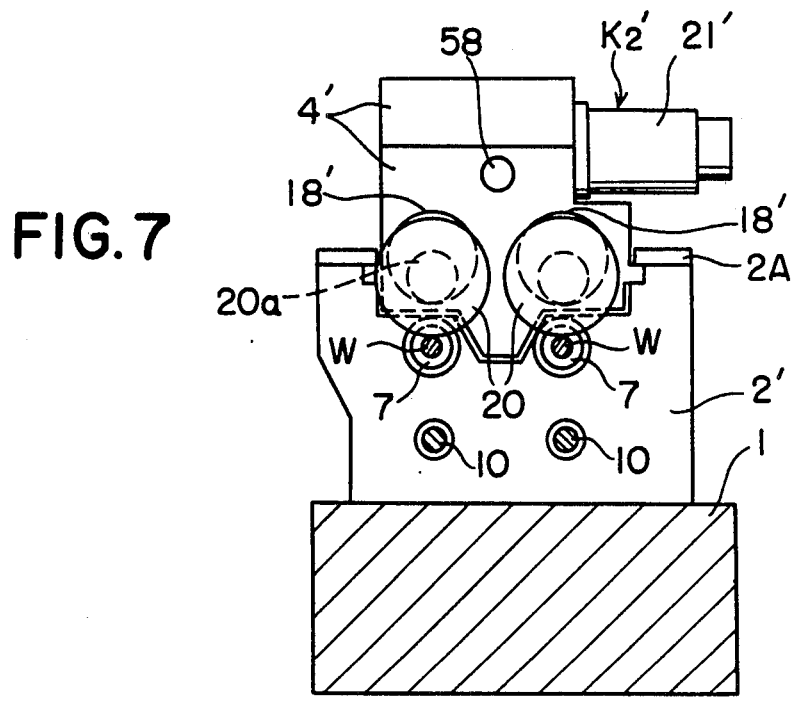
FIG. 7 is a sectional view of the second embodiment taken along the line VII—VII in FIG. 6.
Figure 8:
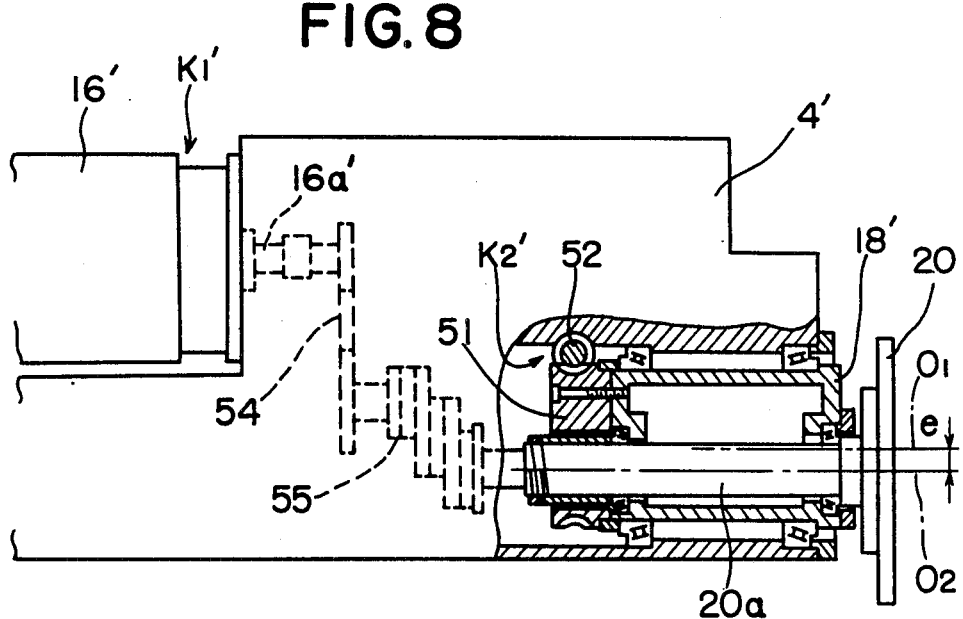
FIG. 8 is a fragmentary sectional view of a tool support carrier shown in FIG. 6.

Referring next to FIGS. 6–8, there is shown a second embodiment of the present invention, wherein component parts identical with those in the first embodiment are respectively designated by the same reference numerals, whereas similar component parts which perform the same or corresponding functions as those in the first embodiment are respectively designated by the same reference numerals each accompanied by an apostrophe ('). This embodiment is different from the foregoing embodiment primarily in the configuration of tool feed mechanisms each for vertically feeding a milling cutter to effect a profiling motion.

More specifically, as shwon in FIG. 8, each of feed mechanisms K2' and K2' of the second embodiment comprises a tool feed motor 21', a worm 52 for transmitting a driving power from the tool feed motor 21' to a wormwheel 51, and a tool support 18' rotatably carried in the tool support carrier 4' and securing the wormwheel 51 to a rear end thereof. A tool spindle 20a is assembled in the tool support 18' such that its axis 02 extends so as to be radially offset by an eccentricity (e) from the axis 01 of the tool support 18'. Accordingly, as the tool support 18' is slowly rotated by the tool feed motor 21' about its axis 01, the milling cutter 20 is turned around the tool support axis 01 while being rotated about its axis 02.

On the other hand, each of tool drive mechanisms K1' and K1' of the second embodiment comprises a tool drive motor 16' secured to the tool support carrier 4', a gear train 54 connected to an output shaft 16a' of the tool drive motor 16', and a Schmidt's coupling 55 connected to the gear train 54 for transmitting a driving power to the tool spindle 20a. Each tool drive mechanism K1' constructed like this rotates the associated milling cutter 20 at a desired rotational speed while the milling cutter 20 is turned around the tool support axis 01.

Further, a reinforcing rod 56 is carried in the upper portion of the tailstock 3' for extensible movement in the sliding direction of the tool support carrier 4' and is connected to a cylinder device 57 secured to the tailstock 3' to be moved toward and away from the tool support carrier 4'. The support carrier 4' is formed at its inner surface with a pilot hole 58 to snugly receive an end portion of the reinforcing rod 56. As cams w1, w2, w3 . . . wn on each workpiece W are successively machined by the associated milling cutter 20, the longitudinal distance (d) from the milling cutters 20 and 20 to the inner wall 2a' of the headstock 2' is increased, so that chatter may occur due to errors in assembling or the tool support carrier 4' may be flexed due to overhanging from the headstock 2'. To obviate such chatter or the flexing of the tool support carrier 4', the reinforcing rod 56 and the pilot hole 58 are engaged with each other while the tool support carrier 4' is away from the retracted or original position thereof. It is to be understood that although FIG. 6 shows the reinforcing rod 56 being disengaged from the pilot hole 58, the reinforcing rod 56 is brought into snug engagement with the pilot hole 58 before the machining on the leftmost cams w1 begins.

The operation of the second embodiment as constructed above is substantially the same as that of the first emboidment, and therefore, further description is omitted for the sake of brevity. However, it should be noted that the second embodiment features each milling cutter 20 which is carried with its axis 02 being radially offset from the axis 01 of the tool support carrier 18' so as to perform the profiling motion and the infeed movement. Thus, the second embodiment has a lowered machine height and is diminished in machine size.

Obviously, numerous modifications and variations of the present invention are possible in light of the above teachings. It is therefore to be understood that within the scope of the appended claims, the present invention may be practiced otherwise than as specifically described herein.

What is claimed is:

1. A cam milling machine comprising:
   a base frame;
   first and second support devices mounted on said base frame and horizontally spaced from each other in a first direction;
   workpiece support means incorporated in said first and second support devices for carrying a plurality of workpieces at a time at their opposite ends so as to enable said workpieces to be rotated about respective axes extending in parallel relation with each other in said first direction;
   workpiece drive means connected to said workpiece support means for rotating said plurality of workpieces supported by said workpiece support means;
   a tool support carrier guided on the top of one of said first and second support devices for sliding movement in said first direction;
   a plurality of tool supports guided on said tool support carrier for movement toward and away from said workpieces over the same wherein each of said tool supports rotatably carries a rotary tool;
   index feed means connected to said tool support carrier for moving said tool support carrier in said first direction so as to bring each of said rotary tools into radial alignment with one of cam portions formed on an associated one of said workpieces;
   tool drive means connected to said rotary tools for rotating said rotary tools;
   tool feed means connected to said plurality of tool supports for moving said tool supports in such a manner that each of said rotary tools over said workpieces is moved toward and away from an associated one of said workpieces carried by said workpiece support means; and
   an in-line transfer way horizontally extending across a space between said first and second support devices for loading said plurality of workpieces to their machining positions defined between said first and second support devices from one side of said base frame and unloading said plurality of workpieces from said machining positions toward the other side opposite to said one side, of said base frame.

2. A cam milling machine comprising:

a base frame;

first and second support devices mounted on said base frame and horizontally spaced from each other in a first direction;

workpiece support means incorporated in said first and second support devices for carrying two workpieces at a time at their opposite ends so as to enable said two workpieces to be rotated about respective axes extending in parallel relation with each other in said first direction;

workpiece drive means connected to said workpiece support means for rotating said two workpieces supported by said workpiece support means;

a tool support carrier guided on the top of one of said first and second support devices for sliding movement in said first direction;

first and second tool supports carried on said tool support carrier for movement toward and away from said workpieces over said workpieces and each rotatably carrying a rotary tool;

index feed means connected to said tool support carrier for moving said tool support carrier in said first direction so as to bring each of said rotary tools into radial alignment with one of cam portions formed on an associated one of said two workpieces;

tool drive means connected to said two rotary tools for rotating said two rotary tools;

first and second tool feed devices respectively connected to said first and second tool supports for moving said first and second tool supports in such a manner that each of said rotary tools over said workpieces is moved toward and away from an associated one of said two workpieces carried by said workpiece support means; and an in-line transfer way horizontally extending across a space between said first and second support devices for loading said two workpieces to their machining positions defined between said first and second support devices from one side of said base frame and unloading said two workpieces from said machining positions toward the other side opposite to said one side of said base frame.

3. A cam milling machine as set forth in claim 2, further comprising means for moving said first and second tool supports independently of each other in a vertical direction, and wherein said tool drive means further comprises:

rotational drive means secured to said tool support carrier; and two universal joints drivingly connected to said rotational drive means for transmitting rotation from said rotational drive means to said two rotary tools respectively carried by said first and second tool supports.

4. A cam milling machine as set forth in claim 2, further comprising means for independently rotating said first and second tool supports carried by said tool support carrier by said drive first and second feed devices and wherein said first and second tool supports respectively carry said two rotary tools so to be rotatable about respective axes each of which is offset from the axis of an associated one of said first and second tool supports, and wherein said tool drive means further comprises:

rotational drive means secured to said tool support carrier; and first and second couplings drivingly connected to said rotational drive means for transmitting rotation from said rotational drive means to said two rotary tools.

5. A cam milling machine as set forth in claim 2, wherein said tool support carrier has a pilot hole opening at a lateral surface thereof facing with the other of said first and second support devices, further comprising:

a reinforcing bar received in said other of said first and second support devices and extensible in said first direction for movement toward and away from said one of said first and second support devices; and an actuator for bringing said reinforcing bar into snug engagement with said pilot hole.

* * * * *